(12) United States Patent
Steffl et al.

(10) Patent No.: US 8,907,218 B2
(45) Date of Patent: Dec. 9, 2014

(54) CABLE AND POLYMER COMPOSITION

(75) Inventors: Thomas Steffl, Lauf (DE); Jennie Langeström, Göteborg (SE); Hans Mårtensson, Stenungsund (SE); Christian Piel, Linz (AT)

(73) Assignee: Borealis AG, Vienna (AT)

( * ) Notice: Subject to any disclaimer, the term of this patent is extended or adjusted under 35 U.S.C. 154(b) by 389 days.

(21) Appl. No.: 13/390,800

(22) PCT Filed: Jul. 6, 2010

(86) PCT No.: PCT/EP2010/059608
§ 371 (c)(1),
(2), (4) Date: May 29, 2012

(87) PCT Pub. No.: WO2011/023440
PCT Pub. Date: Mar. 3, 2011

(65) Prior Publication Data
US 2012/0325515 A1 Dec. 27, 2012

(30) Foreign Application Priority Data
Aug. 26, 2009 (EP) .................................. 09010916

(51) Int. Cl.
| H01B 7/00 | (2006.01) |
| C08L 23/04 | (2006.01) |
| C08L 23/08 | (2006.01) |
| H01B 3/44 | (2006.01) |
| C08L 23/06 | (2006.01) |

(52) U.S. Cl.
CPC .............. *C08L 23/04* (2013.01); *C08L 23/0815* (2013.01); *H01B 3/441* (2013.01); *C08L 23/06* (2013.01); *C08L 2203/202* (2013.01); *C08L 2205/02* (2013.01); *C08L 2308/00* (2013.01); *C08L 2314/02* (2013.01)
USPC ................... 174/110 R; 174/36; 174/110 SR; 174/110 AR (58) Field of Classification Search
CPC .............. H01B 1/00; H01B 3/00; H01B 5/00; H01B 7/00; H01B 9/00; H01B 11/00; H01B 12/00; H01B 15/00; H01B 17/00; H01B 19/00; C08G 2/00; C08G 10/00; C08G 110/00; C08G 210/00; C08G 251/00; C08G 293/00
USPC .............. 174/110 R, 110 AR, 102 R, 102 SC, 174/105 R, 106 R, 106 SC, 120 R, 120 C, 174/120 SC; 523/173
See application file for complete search history.

(56) References Cited

U.S. PATENT DOCUMENTS

| 6,441,084 B1 * | 8/2002 | Lee et al. ...................... 524/495 |
| 6,501,027 B1 * | 12/2002 | Belli et al. .................. 174/110 F |
| 6,768,060 B2 * | 7/2004 | Belli et al. .................. 174/110 F |
| 6,797,886 B1 * | 9/2004 | Gustafsson et al. ...... 174/110 R |
| 6,861,143 B2 * | 3/2005 | Castellani et al. ............ 428/379 |
| 7,378,472 B2 * | 5/2008 | Fell et al. ........................ 526/64 |
| 7,579,408 B2 * | 8/2009 | Walton et al. .................. 525/191 |
| 7,795,366 B2 * | 9/2010 | Yang et al. ..................... 526/348 |
| 8,461,266 B2 * | 6/2013 | Junqvist et al. ............... 525/191 |
| 2007/0299181 A1 * | 12/2007 | Nakata et al. .................. 524/394 |
| 2009/0105374 A1 * | 4/2009 | Wu et al. ........................... 524/8 |

FOREIGN PATENT DOCUMENTS

| EP | 0 472 946 | 3/1992 |
| EP | 0 688 794 | 12/1995 |
| EP | 0 810 235 | 11/2004 |
| EP | 1 739 103 | 1/2007 |
| EP | 1 752 462 | 2/2007 |
| WO | WO 93/08222 | 4/1993 |
| WO | WO 96/18662 | 6/1996 |
| WO | WO 97/28170 | 8/1997 |
| WO | WO 98/32776 | 7/1998 |
| WO | WO 99/51646 | 10/1999 |
| WO | WO 99/61489 | 12/1999 |
| WO | WO 01/37289 | 5/2001 |
| WO | WO 01/55230 | 8/2001 |
| WO | WO 03/010208 | 2/2003 |
| WO | WO 03/051514 | 6/2003 |
| WO | WO 03/051934 | 6/2003 |
| WO | WO 03/106510 | 12/2003 |
| WO | WO 2004/085499 | 10/2004 |
| WO | WO 2005/002744 | 1/2005 |
| WO | WO 2005/118655 | 12/2005 |

OTHER PUBLICATIONS

International Preliminary Report on Patentability issued Feb. 28, 2012 for International application No. PCT/EP2010/059608.
CEI IEC 60811-4-1:2004, International Standard, Second Edition, *Insulating and Sheathing Materials of Electric and Optical Cables—Common Test Methods*, Jun. 2004.
McAuley, K.B. et al., *On-Line Inference of Polymer Properties in an Industrial Polyethylene Reactor*, AIChE Journal, Jun. 1991, vol. 37, No. 6, pp. 825-835.
Encyclopedia of Materials: Science and Technology, Elsevier 2001, pp. 7181-7184.
DesLauriers, Paul J., et al., *Quantifying short chain branching microstructures in ethylene 1-olefin copolymers using size exclusion chromatography and Fourier transform infrared spectroscopy*, Elsevier Polymer 43, 2002, pp. 159-170.
Rauwendaal, Chris, *Polymer Extrusion*, $2^{nd}$, reprinted edition, 1990, pp. 460-489.

(Continued)

*Primary Examiner* — William H Mayo, III
(74) *Attorney, Agent, or Firm* — Fay Sharpe LLP (57) ABSTRACT

The invention relates to a cable having a conductor surrounded by at a least one polymer layer having a polymer composition of the invention which has a polymer component and optionally a carbon black (CB) component, to a production process of the cable and to a polymer composition of the invention which has a polymer component and optionally a carbon black (CB) component and which is for use in a cable layer.

20 Claims, 3 Drawing Sheets

(56) References Cited

OTHER PUBLICATIONS

Heino, Eeva-Leena, *The influence of molecular structure on some rheological properties of polyethylene*, Annual Transactions of the Nordic Rheology Society, vol. 3, 1995, pp. 71-73.

Heino, Eeva-Leena, et al., *Rheological Characterization of Polyethylene Fractions*, Theoretical and Applied Rheology, Aug. 1992, pp. 360-362.

Second Edition, Encyclopedia of Polymer Science and Engineering, vol. 6, 1986, pp. 382-411.

Perry's Chemical Engineers' Handbook, Seventh Edition, 1997, 13-25.

International Search Report mailed Aug. 17, 2010 for International application No. PCT/EP2010/059608.

Written Opinion mailed Aug. 17, 2010 for International application No. PCT/EP2010/059608.

\* cited by examiner

CABLE AND POLYMER COMPOSITION

TECHNICAL FIELD

The present invention is directed to a polymer composition comprising a polymer and optionally a filler, to a use thereof for producing a cable layer, to a cable surrounded by at least one layer comprising the polymer composition, as well as to a preparation process of the cable.

BACKGROUND ART

A typical electric cable generally comprises a conductor that is surrounded by one or more layers depending on the application area. E.g. power cable has several layers of polymeric materials including an inner semiconducting layer, followed by an insulating layer, and then an outer semiconducting layer. To these layers, one or more further auxiliary layer(s) may be added. The outer protecting polymeric layer is known i.a. as a jacketing layer. Any of the layers can be crosslinked as well known in the field.

Safety, reliability and long use life are important key factors required for cable applications. As the outer jacketing layer provides the outer protection of the cable, it plays an important role to provide system functionality.

Low density polyethylene (LDPE) which is e.g. produced in a high pressure process has been conventionally used in all types of cable layers including jacketing layers. The drawback thereof is their unsatisfactory mechanical properties required for a protective jacketing layer.

Linear low density polyethylene (LLDPE) is known i.a. as a jacketing layer material. However and typically, also the LLDPE is not fully satisfactory as regards to the mechanical properties required for a polymer in a cable layer, such as a jacketing layer.

The mechanical properties of the layer can be improved by increasing the density of the polyethylene. High density polyethylene (HDPE) polymers indeed provide i.a. improved mechanical strength to a cable layer, such as abrasion resistance. However, HDPE has a disadvantage of limited stress cracking resistance, expressed e.g. as ESCR, and decreased flexibility required i.a. for a jacketing layer.

Multimodal polyethylene (PE) provides one way of tailoring the polymer properties. To enable the use of a multimodal PE in a jacketing layer, the property balance should be optimised i.a. with respect to mechanical properties, such as strength, stress cracking resistance and flexibility, and to processability. Various solutions have been provided, but there is still needs for alternative or improved property balance.

Moreover, e.g. single site catalyst (SSC) offers i.a. controlled incorporation of comonomers which provides a further means for tailoring the polymer. However, the processability of SS catalyst based PE is often problematic.

There is a continuous need in the polymer field to find polymers which are suitable for demanding polymer applications, particularly for W&C applications, where the cable materials must meet high requirements and stringent authority regulations.

OBJECTS OF THE INVENTION

One of the objects of the present invention is to provide an alternative polymer composition which has advantageous properties for use in a cable layer, and particularly has excellent mechanical properties combined with advantageous processing properties for use in a protective jacketing layer. Also a preparation process of the polymer composition is provided.

A further object of the invention is to provide a cable comprising a conductor surrounded by one or more layer(s) wherein at least one layer contains a polyethylene polymer composition having advantageous mechanical properties. Preferably, the jacketing layer comprises the polymer composition. Also a preparation process of said cable is provided. Moreover, the use of the polymer composition of the invention in a cable layer is provided.

DETAILED DESCRIPTION OF THE INVENTION

Figure 1:
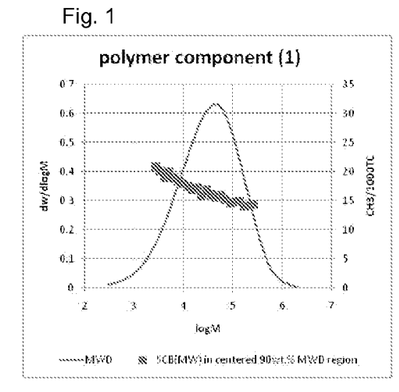
FIGS. 1-9 illustrate the SCB(MW) profiles determined for the polymer components 1-3, inventive polymer compositions 1-3 and reference 1-2, in that order. The curves in figures: - MWD, ■ SCB(MW) in centered 90 wt % MWD region.
Figure 2:
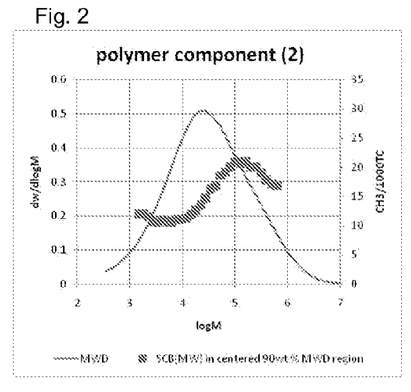
Figure 3:
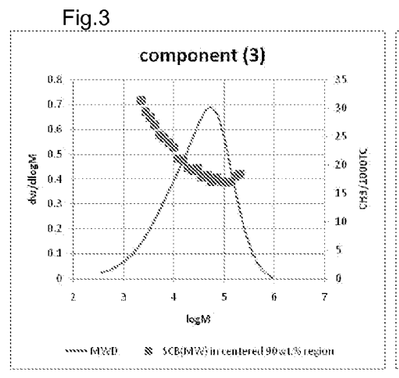
Figure 4:
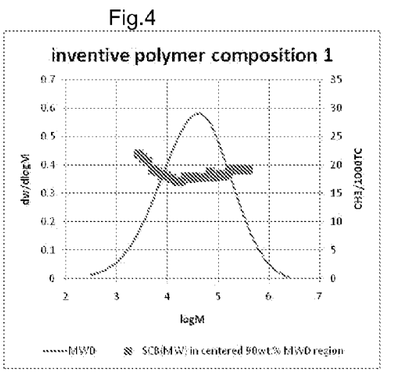
Figure 5:
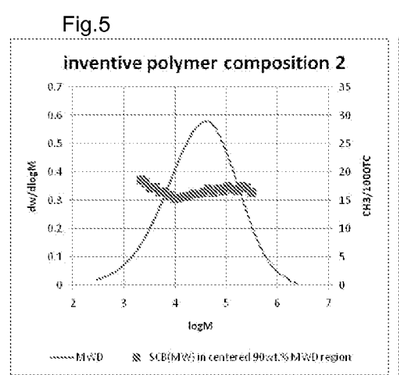
Figure 6:
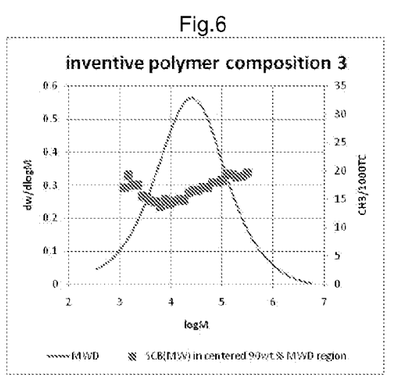
Figure 7:
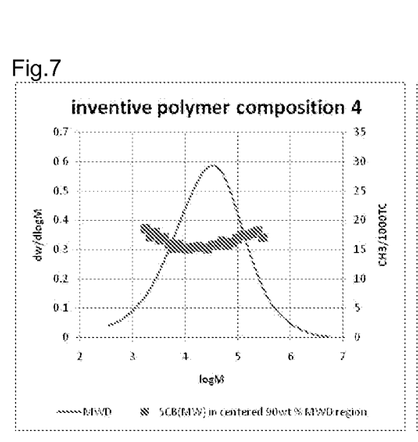
Figure 8:
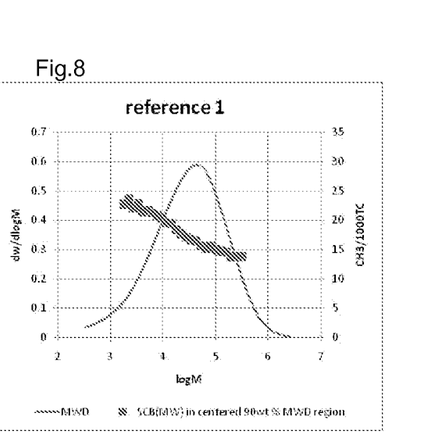
Figure 9:
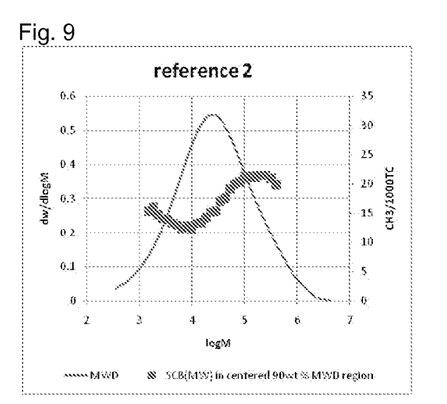
Figure 10:
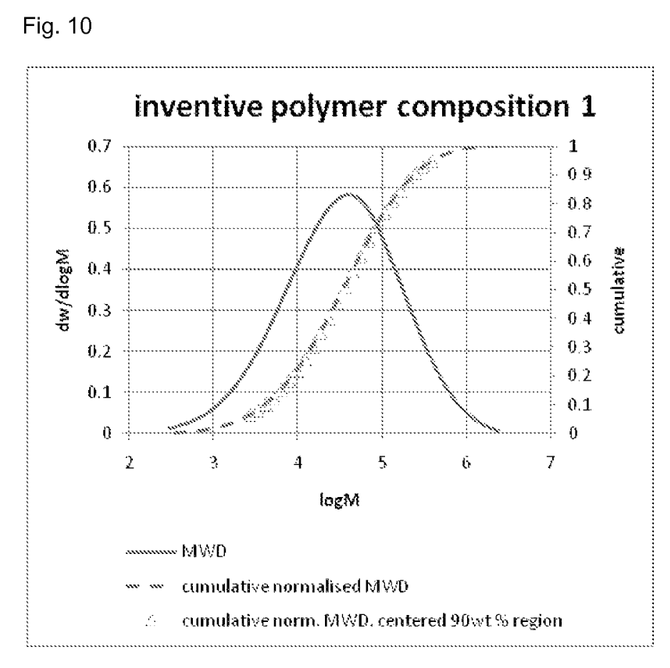
FIG. 10 is an integration example illustrating determination of the centered 90 wt. % of the inventive polymer composition 1. The curves in figures: - MWD (continuous line), - - cumulative normalised MWD (dashed line), Δ cumulative normalised MWD, centered 90 wt % region.

Accordingly, the invention is directed to a polymer composition comprising a polymer component and optionally a carbon black (CB) component, wherein the polymer composition has a flexural modulus of less than 390 MPa, when determined according to ISO 178 using a test specimen (pressed specimen prepared from the pellets of the polymer composition, dimensions 80×10×4.0 mm, length×width× thickness), and a strain at break (%) of 700% or more, when determined according to ISO 527-1:1993 using a test specimen prepared according ISO527-2:1993 5A (pressed specimen prepared from the pellets of the polymer composition).

It has now been found that the above defined property balance of the polymer composition is excellent for the end applications of polymers, wherein a good mechanical protection is needed without sacrificing the flexibility, such as in cable layer applications.

The polymer composition of the invention is interchangeably shortly referred herein below as "Polymer composition", the polymer component as "Polymer" and the carbon black as "CB". It is understood herein that the term polymer component (Polymer) can comprise one polymer component or a blend of two or more polymer components which are different.

Due to the highly advantageous balance between flexural modulus and the tensile properties the Polymer composition is very suitable material for cable layer(s), preferably for a jacketing layer which provides the protective cover for the cables.

The invention is also directed to the use of the Polymer composition for making an article, preferably at least one layer of the cable and also to a cable comprising a conductor surrounded by one or more layers, wherein at least one layer comprises a Polymer composition as defined above or below or in claims.

The term "conductor" means herein above and below that the conductor comprises one or more wire(s). Moreover, the cable may comprise one or more such conductor(s). Preferably the conductor is an electrical conductor.

"Cable" covers all type of wires and cables used in the wire and cable (W&C) applications.

The cable may comprise two or more layers comprising the Polymer composition. The said at least one layer of the Cable comprising the Polymer composition is preferably a jacketing layer.

Preferably, the polymer component of the Polymer composition contains short chain branching (SCB) which is typically defined as the amount of $CH_3$ end groups per 1000 carbon atoms ($CH_3$ groups per 1000 carbon atoms, or shortly $CH_3/1000$). Herein the SCB is expressed as SCB distribution profile as a function of molecular weight and by defining the arithmetic mean value X, together with ±variation, of methyl groups per 1000 total carbon atoms in centered 90 weight-% of the total region of the molecular weight distribution (MWD). The "short chain branching distribution as a function of molecular weight" is herein named also shortly as "SCB(MW) profile" and "methyl groups per 1000 total carbons" as "$CH_3/1000TC$". Accordingly, the polymer component of the Polymer composition has a SCB(MW) profile of X±5 $CH_3/1000TC$, preferably of X±4 $CH_3/1000TC$, more preferably of X±3 $CH_3/1000TC$, wherein X is the arithmetic mean in centered 90 weight-% of total region of the molecular weight distribution (MWD), as determined according to the SCB determination method as described under "Determination methods".

The variation ±5, preferable ±4, more preferable ±3, around the arithmetic mean X shows that the SCB(MW) profile of the polymer component is linear. Without limiting to any theory it is believed that the SCB distribution profile and the linearity thereof as defined above and below or in claims contributes to the excellent mechanical property balance of the Polymer composition.

More preferably, said arithmetic mean X of SCB(MW) profile of the polymer component is of 17 in centered 90 weight-% of total region of the molecular weight distribution (MWD) and the polymer component of the polymer composition has a SCB(MW) of 17±5 $CH_3/1000TC$, preferably of 17±4 $CH_3/1000TC$, more preferably of 17±3 $CH_3/1000TC$, in centered 90 weight-% of total region of the molecular weight distribution (MWD), when determined according to the SCB determination method as described under "Determination methods".

The Polymer composition has preferably a flexural modulus of less than 350 MPa, preferably of less than 330 MPa, more preferably from 320 to 150 MPa, even more preferably from 310 to 200 MPa.

The Polymer composition has preferably a stress at break of at least 20 MPa, preferably of at least 23 MPa, more preferably of at least 24 MPa, when determined according to ISO 527-1:1993 using a sample prepared according ISO527-2: 1993 5A (pressed test specimen prepared from pellets of the polymer composition). The upper limit of stress at break is not limited, but can vary, and may be e.g. of up to 40 MPa.

Moreover, the further tensile property of the Polymer composition, i.e. the strain at break (%) is preferably of 750% or more, when determined according to ISO 527-1:1993 using a sample prepared according ISO527-2: 1993 5A (pressed test specimen prepared from pellets of the polymer composition). The upper limit of the strain at break is not limited, but can vary, and may be e.g. of up to 1000%.

Even more preferably, the $MFR_2$ of the Polymer composition is of less than 2.0 g/10 min, preferably of less than 1.4 g/10 min, more preferably from 0.05 to 1.2 g/10 min, more preferably from 0.1 to 1.0 g/10 min, more preferably from 0.15 to 0.8 g/10 min, even more preferably from 0.15 to 0.5 g/10 min, when measured according to ISO 1133 (190° C., at 2.16 load). In some embodiments the preferred range of $MFR_2$ of the Polymer composition is from 0.2 to 0.4 g/10 min.

Also preferably, the Polymer composition has very good stress cracking properties expressed as environmental stress cracking properties (ESCR), namely an ESCR of at least 1500 hours, preferably of at least 2000 hours, more preferably of at least 2500 hours, when determined according to IEC 60811-4-1:2004, procedure in Chapter 8, "Resistance to environmental stress cracking", Procedure B, 10% by volume solution in water of Igepal CO-630.

The Polymer composition has preferably also very good rheological properties indicated herein as shear thinning index (SHI), namely a shear thinning index, $SHI_{2.7/210}$, of at least 45, preferably of at least 50, preferably of at least 60, preferably of at least 70, preferably of at least 75, more preferably from 75 to 400, more preferably from 75 to 300, more preferably from 75 to 200, even more preferably from 80 to 100, even more preferably from 80 to 95, when measured as described under "Determination methods". The above SHI values indicate the advantageous processability properties of the Polymer composition which preferably also contributes to the very good surface properties of the final article, such as a cable layer.

The density of the Polymer composition is preferably of more than 890 $kg/m^3$, preferably from 900 to 950 $kg/m^3$, preferably from 910 to 940 $kg/m^3$, more preferably from 915 to 938 $kg/m^3$, more preferably from 920 to 937 $kg/m^3$.

The Polymer composition preferably comprises at least 50 weight % (wt %) of a Polymer, preferably at least 70 wt %, preferably at least 75 wt %, preferably at least 80 wt %, preferably at least 80 wt % at least 85 wt %, more preferably of at least 90 wt %, based on the total amount of the Polymer composition.

The cable according to the invention comprises a polymer composition which has preferably at least one, more preferably at least two, and most preferably all of the properties as regards flexural modulus, stress at break, strain at break and density as defined above.

It is understood above and below or claims that the wt % ratios of the components of the Polymer composition, when given "based on the total amount of the Polymer composition", are chosen so that the total amount of the Polymer composition is 100 wt %.

The "CB component" means carbon black as such or a carbon black masterbatch (CBMB), which is a blend of the carbon black together with a carrier polymer. The carbon black content in the polymer composition is defined above and below either as an amount of the carbon black as such or as an amount of CBMB, based on the total amount of the polymer composition or based on the combined amount of the Polymer component and CB or, respectively, CBMB, as specified in the context. Accordingly, if CBMB is used, then it is blended preferably in the below given amounts to the Polymer of the Polymer composition to form a blend thereof.

The optional CB component is preferably present in the Polymer composition. Preferably, the Polymer composition contains up to 20 wt %, preferably from 0.1 to 15 wt %, more preferably from 0.2 to 10 wt %, more preferably from 0.3 to 6 wt %, of carbon black as such ("pure" CB), based on the total amount of the Polymer composition, preferably based on the combined amount of the Polymer component and CB.

The CB is preferably in form of a CBMB. Then the Polymer composition contains up to 50 wt %, preferably up to 30 wt %, preferably up to 25 wt %, preferably from 1 to 20 wt %, more preferably from 3 to 15 wt %, more preferably from 4 to 10 wt %, of CBMB, based on the total amount of the Polymer composition, preferably based on the combined amount of the Polymer component and CBMB. The carrier polymer is a component of the CBMB.

The Polymer composition is preferably a polyethylene composition, wherein the Polymer comprises at least one polyethylene component. Term "Polyethylene" means homopolymer of ethylene or a copolymer of ethylene with one or more comonomer(s).

More preferably, the Polymer of the preferable polyethylene composition comprises a blend of at least two polyethylene components.

According to a preferred embodiment of the Polymer composition, the Polymer of the Polymer composition is a blend of at least two polyethylene components (1) and (2) which are different, more preferably the Polymer composition comprises (1) at least 30 wt % of a polyethylene component which is an ethylene homopolymer or copolymer of ethylene which contains one or more comonomer(s), (2) less than 70 wt % of a polyethylene component which is an ethylene olefin homopolymer or copolymer of ethylene which contains one or more comonomer(s), and (3) up to 20 wt %, preferably from 0.1 to 15 wt %, more preferably from 0.2 to 10 wt %, more preferably from 0.3 to 6 wt %, of optional carbon black as such, based on the total amount of the Polymer composition. CB is preferably introduced as CBMB. The amount of CBMB is up to 50 wt %, preferably from 1 to 20 wt %, more preferably from 3 to 15 wt %, more preferably from 4 to 10 wt %, of CBMB, based on the total amount of the Polymer composition, preferably based on the combined amount of the polymer component (1), polymer component (2) and CBMB.

As well known "comonomer" refers to copolymerisable comonomer units.

More preferably, the polymer component (1) is a polyethylene which has long chain branching, more preferably a low density polyethylene (LDPE) polymer and the polymer component (2) a linear low density polyethylene (LLDPE) polymer.

Long chain branching means herein polymer chain branches with length of more than 12 carbon atoms present in the backbone and/or other branches of a polymer. E.g. an LDPE polymer contains long chain branches.

The polymer components (1) and (2) can be blended mechanically by conventional means, e.g in a mixer or an extruder, or in both, or by bending in situ, i.e. during the polymerisation process of the component(s). Mechanical and in-situ blending are both well known in the field. Preferably, the blend of the Polymer composition is a mechanical blend. The optional CB component (3) is preferably added to the other component(s) in the form of a CBMB in a manner well known in the art.

The final choice of the polymer components and the weight ratio thereof is within the skills of a skilled person and can be adapted based on the properties of the individual polymer components in order to meet the new and inventive property balance of claim 1, or, preferably, the preferable further subgroups and further properties and embodiments of the invention.

The each polymer component (1) and (2) and the carrier polymer of the optional, and preferable, CBMB (3) preferably contributes to the preferable SCB content and distribution. The components can be chosen so that the preferable SCB distribution of the Polymer composition is met.

More preferably the Polymer composition contains, (1) at least 40 wt %, preferably at least 45 wt %, more preferably at least 50 wt %, more preferably of from 53 to 70 wt %, of an LDPE polymer selected from an LDPE homopolymer or an LDPE copolymer of ethylene with one or more comonomer(s);

(2) less than 60 wt %, more preferably less than 55 wt %, more preferably less than 50 wt %, more preferably less than 43 wt %, more preferably from 40 to 30 wt %, of an LLDPE polymer which is preferably a multimodal linear low density copolymer of ethylene with one or more olefin comonomers, preferably with C3-C20 alpha olefin comonomer(s), and (3) up to 20 wt %, preferably from 0.1 to 15 wt %, more preferably from 0.2 to 10 wt %, more preferably from 0.3 to 6 wt %, the optional carbon black as such, based on the total amount of the Polymer composition, preferably based on the combined amount of the polymer component (1), polymer component (2) and the optional CB component (3). CB component is preferably present and is preferably introduced to the composition in a form of the CBMB as defined above.

In this embodiment the Polymer composition preferably comprises the polymer component (1) and polymer component (2) in the above given amounts and (3) CBMB component from 1 to 20 wt %, preferably from 3 to 15 wt %, more preferably from 4 to 10 wt %, based on the total amount of the Polymer composition, preferably based on the combined amount of the polymer component (1) polymer component (2) and the optional CBMB (3).

Again, it is understood above and below or claims that the wt % ratios of the components of the Polymer composition, when given "based on the combined amount of the polymer component (1) polymer component (2) and the optional CB component (3), preferably the optional CBMB (3)", are chosen so that the total combined amount of the components (1) to (3) is 100 wt %.

Multimodal linear low density copolymer of ethylene is referred herein as "multimodal LLDPE copolymer". The multimodality of the LLDPE copolymer, unless otherwise stated, means herein the multimodality with respect to the molecular weight distribution (MWD) of the LLDPE copolymer component (2). The multimodality of the (2) the LLDPE copolymer further contributes to the preferable mechanical property balance of the invention.

The Polymer composition of the invention may contain further components such as further polymer component(s) and/or additive(s), preferably additive(s), such as antioxidant(s), crosslinking agents, such as free radical generating agent(s), e.g. organic peroxide(s), scorch retarder(s) (SR), crosslinking booster(s), stabiliser(s), processing aid(s), flame retardant additive(s), water tree retardant additive(s), acid scavenger(s), inorganic filler(s) and voltage stabilizer(s), as known in the polymer field.

The preferred Polymer composition consists of the Polymer, preferably of the blend of polymer component (1) and polymer component (2), as the only polymer component(s). The expression means that the Polymer composition does not contain further polymer components, but the Polymer or blend of polymer components (1) and (2) as the sole polymer component(s). However, it is to be understood herein that the Polymer composition may comprise further component(s) other than polymer components, such as the optional CB component (3) and/or additive(s) which may optionally be added in a mixture with a carrier polymer, i.e. in so called master batch. Accordingly, the Polymer composition may comprise, and preferably further comprises, the carrier polymer of CBMB, but the carrier polymer of a master batch is not understood to be within the meaning of "Polymer" or "Polymer component".

Polymer composition of the invention may be crosslinkable, e.g. for crosslinkable cable applications which are subsequently crosslinked. Crosslinking can be effected i.a. by radical reaction using radiation or free radical generating agents. Examples of such free radical generating agents are peroxides including inorganic and organic peroxide(s). A further well known crosslinking method is crosslinking via functional groups, e.g. by hydrolysing hydrolysable silane groups, which are attached (either via copolymerisation or via grafting) to polymer, and subsequently condensing the formed silanol groups using a silanol condensation catalyst.

The further and preferable properties, subgroups as well as embodiments of the Polymer composition and Cable given above or below are given in general terms meaning that they can be combined in any combination to further define the preferable embodiments of the invention.

The Polymer composition comprises the Polymer, preferably the blend of polymer component (1) and the polymer component (2), and the optional CB component (3) as defined above. The components (1) to (3) are further described below in terms of further properties and preferable subgroups or embodiments of further and above given properties. The detailed description for components applies naturally both for the Polymer composition and the Cable. As evident said further or preferable properties, subgroups and embodiments of components 1 to 3 are given in general terms meaning that they can be combined in any combination to further define the preferable embodiments of the invention. If not specified in the description part, then the measurement methods for the further preferable properties as defined above or below for the Polymer composition, Polymer, the CB and the Cable are described later below under "Determination methods".

Polymer Component (1)

The polymer component (1) is preferably an olefin homopolymer or copolymer with one or more comonomer(s), more preferably a polyethylene, preferably a polyethylene which may be produced in a high pressure process or in a low pressure process. More preferably, the polymer component (1) is a polyethylene which has long chain branching, more preferably is a low density polyethylene (LDPE) polymer. The meaning of the LDPE polymer is well known and documented in the literature.

The polymer component (1) is preferably an LDPE polymer produced in a high pressure process. More preferably, the LDPE polymer is selected from an LDPE homopolymer or an LDPE copolymer of ethylene with one or more comonomers.

In case of an LDPE copolymer of ethylene, the one or comonomer(s) may be selected from non-polar comonomer(s) or polar comonomer(s), or from any mixtures thereof, as well known.

As the polar comonomer, comonomer(s) containing hydroxyl group(s), alkoxy group(s), carbonyl group(s), carboxyl group(s), ether group(s) or ester group(s), or a mixture thereof, can used. More preferably, comonomer(s), if present, containing carboxyl and/or ester group(s) are used as said polar comonomer. Still more preferably, the polar comonomer(s) of an LDPE copolymer of ethylene is selected from the groups of acrylate(s), methacrylate(s) or acetate(s), or any mixtures thereof. If present in said LDPE copolymer of ethylene, the polar comonomer(s) is preferably selected from the group of alkyl acrylates, alkyl methacrylates or vinyl acetate, or a mixture thereof. Further preferably, said polar comonomers are selected from C1- to C6-alkyl acrylates, C1- to C6-alkyl methacrylates or vinyl acetate. Still more preferably, said LDPE copolymer of ethylene, is a copolymer of ethylene with C1- to C4-alkyl acrylate, such as methyl, ethyl, propyl or butyl acrylate, or vinyl acetate, or any mixture thereof.

Non-polar comonomer means herein comonomer(s) which do not contain hydroxyl group(s), alkoxy group(s), carbonyl group(s), carboxyl group(s), ether group(s) or ester group(s). One group of preferable non-polar comonomer(s) comprise, preferably consist of, monounsaturated (═One double bond) comonomer(s), preferably olefins, preferably alpha-olefin(s), more preferably $C_3$ to $C_{10}$ alpha-olefin(s), such as propylene, 1-butene, 1-hexene, 4-methyl-1-pentene, styrene, 1-octene, 1-nonene; polyunsaturated (═more than one double bond) comonomer(s); a silane group containing comonomer(s); or any mixtures thereof. The polymer component (1), preferably the LDPE polymer may contain hydrolysable silane groups containing comonomer or be grafted with hydrolysable silane containing compounds in a manner known in the art. This may be the case if e.g. crosslinking the Polymer via silane technology is desired for the end application.

The LDPE polymer, may optionally have an unsaturation which preferably originates from vinyl groups, vinylidene groups and trans-vinylene groups. The unsaturation can be provided by polymerizing monomer, preferably ethylene, in the presence of a chain transfer agent (CTA), which introduces e.g. vinyl groups to the polymer chain, or in the presence of one or more polyunsaturated comonomer(s), as mentioned above, and optionally in the presence of a chain transfer agent which introduces e.g. vinyl groups to the polymer chain. The unsaturated polyolefins and the preferable unsaturated LDPE polymers are well known. The unsaturation level can be influenced by the selected polymerization conditions such as peak temperatures and pressure, as well known in the field.

It is well known that e.g. propylene can be used as a comonomer or as a chain transfer agent (CTA), or both, whereby it can contribute to the total amount of the C—C double bonds, preferably to the total amount of the vinyl groups. Herein, when a compound which can also act as comonomer, such as propylene, is used as CTA for providing double bonds, then said copolymerisable comonomer is not calculated to the comonomer content.

Preferably the density of the polymer component (1), preferably of an LDPE polymer, is higher than 860 kg/m³. Preferably the density of Polymer component (1), preferably of an LDPE polymer is not higher than 960 kg/m³, more preferably from 910 to 945 kg/m³, more preferably from 920 to 945 kg/m³.

The MFR$_2$ (ISO 1133, 190° C. at 2.16 load) of the polymer component (1) preferably of an LDPE polymer, is preferably from 0.01 to 50 g/10 min, preferably is from 0.1 to 20 g/10 min, preferably of less than 10 g/10 min, preferably of less than 5 g/10 min, more preferably of less than 3 g/10 min, more preferably of less than 2.0 g/10 min, more preferably from 0.1 to 1.5 g/10 min, preferably from 0.5 to 1.4 g/10 min, more preferably from 0.7 to 1.2 g/10 min.

The preferred polymer component (1) is an LDPE homopolymer or an LDPE copolymer as defined above, which may optionally be unsaturated. If the LDPE homopolymer is unsaturated, then the unsaturation is provided by a chain transfer agent (CTA) and/or by polymerization conditions. If the LDPE copolymer is unsaturated, then the unsaturation can be provided by any of the following means: by a chain transfer agent (CTA), by one or more polyunsaturated comonomer(s) and/or by polymerization conditions. In case of an LDPE copolymer, it is preferably an unsaturated LDPE copolymer of ethylene with at least one polyunsaturated comonomer, preferably a diene, and optionally with other comonomer(s), such as polar comonomer(s) which is preferably acrylate or acetate comonomer(s); more preferably an unsaturated LDPE copolymer of ethylene with a polyunsaturated comonomer, preferably a diene.

The LDPE homo or copolymers (1) suitable for the present invention are commercially available or can be produced analogously or according to known polymerisation process.

The high pressure (HP) process is the preferred process for producing a polyolefin of the Polymer composition, preferably a low density polyethylene (LDPE) polymer selected from an LDPE homopolymer or an LDPE copolymer of ethylene with one or more comonomers. Accordingly, the polyolefin of the invention is preferably produced at high pressure by free radical initiated polymerisation in the presence of initiator(s) (referred to as high pressure radical polymerization).

The high pressure (HP) polymerisation and the adjustment of process conditions for further tailoring the other properties of the polyolefin depending on the desired end application are well known and described in the literature, and can be readily be used by a skilled person. Suitable temperatures range up to 400° C., preferably from 80 to 350° C. and pressure from 70 MPa, preferably 100 to 400 MPa, more preferably from 100 to 350 MPa. Pressure can be measured at least in compression stage and after the tube. Temperature can measured at several points during all steps.

After the separation the obtained polymer is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner to result in the Polymer composition.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mahling pp. 7181-7184. Moreover, i.a. WO 9308222 describes a high pressure radical polymerisation of ethylene with polyunsaturated monomers, such as an $\alpha,\omega$-alkadienes, to increase the unsaturation of an ethylene copolymer.

Polymer Component (2)

Polymer component (2) is preferably an olefin homopolymer or copolymer which contains one or more comonomer(s), more preferably a polyethylene, preferably a linear low density polyethylene (LLDPE) polymer. The preferred polymer component (2) is a multimodal linear low density copolymer of ethylene with one or more olefin comonomers, i.e. a multimodal LLDPE copolymer.

The term "multimodal" means herein, unless otherwise stated, multimodality with respect to molecular weight distribution and includes also bimodal polymer. Generally, a polyethylene comprising at least two polyethylene fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

The multimodal LLDPE copolymer usable in the present invention comprises a lower weight average molecular weight (LMW) component (A) and a higher weight average molecular weight (HMW) component (B). Said LMW component has a lower molecular weight than the HMW component.

Naturally, the multimodal LLDPE copolymer may be, and preferably is, multimodal also with respect to density and comonomer content. I.e. the LMW and HMW components preferably have different comonomer content and density.

The multimodal LLDPE is preferably produced by a coordination catalyst, preferably selected from a Ziegler Natta catalyst, a single site catalyst, which comprises a metallocene and non-metallocene catalyst, and a Cr catalyst, or any mixture thereof, more preferably is produced by Ziegler Natta catalyst. Herein such polymers are referred to as znLLDPE copolymers.

The multimodal LLDPE copolymer, preferably the multimodal znLLDPE copolymer, comprises preferably:

(A) from 30 to 70% by weight (wt %), preferably from 40 to 60% by weight, based on the combined amount of components (A) and (B), of a low molecular weight (LMW) ethylene polymer selected from ethylene homopolymer and a copolymer of ethylene with one or more alpha-olefin comonomer(s) having from 3 to 20 carbon atoms, and (B) from 30 to 70% by weight, preferably from 40 to 60% by weight, based on the combined amount of components (A) and (B), of a high molecular weight (HMW) copolymer of ethylene with one or more alpha-olefin comonomer(s) having from 3 to 20 carbon atoms, wherein the LMW component and HMW component are different More preferably, the multimodal LLDPE copolymer, preferably the multimodal znLLDPE copolymer, comprises:

(A) from 40 to 60% by weight, preferably 45 to 55 wt %, based on the combined amount of components (A) and (B), of a low molecular weight (LMW) ethylene polymer selected from ethylene homopolymer or a copolymer of ethylene and one or more alpha-olefins having from 3 to 16 carbon atoms, and preferably having a weight average molecular weight of from 5000 to 150000 g/mol, preferably 5000 to 130000 g/mol, preferably from 10000 to 100000 g/mol, more preferably from 15000 to 80000 g/mol; and (B) from 40 to 60% by weight, preferably 45 to 55 wt %, based on the combined amount of components (A) and (B), of a high molecular weight (HMW) copolymer of ethylene with one or more alpha-olefin comonomer(s) having from 3 to 16 carbon atoms and preferably having a weight average molecular weight of from 100000 to 1000000 g/mol, preferably from 130000 to 500000 g/mol, more preferably from 150000 to 500000 g/mol.

The low molecular weight ethylene polymer (A) is ethylene homopolymer or copolymer and preferably has a density which is higher than the density of HMW component (B). The $MFR_2$ (ISO 1133, 190° C. at 2.16 load) of said (LMW) ethylene homopolymer or copolymer is preferably of less 400 g/10 min, preferably from 4.0 to 400 g/10 min. Preferably the (LMW) homopolymer of ethylene (A) has a density of from less than 960 kg/m³, preferably from 910 to 950 kg/m³.

The high molecular weight copolymer (B) is a copolymer of ethylene and one or more alpha-olefins having from 4 to 10, preferably 4 to 8 carbon atoms.

The $MFR_2$ (ISO 1133, 190° C. at 2.16 load) of said (HMW) ethylene copolymer (B) is preferably less than 0.5 g/10 min, more preferably from 0.01 to 0.3 g/10 min. The high molecular weight ethylene copolymer of ethylene (B) of the PE copolymer has preferably a density of from 890 to 930 kg/m³, preferably of from 900 to 920 kg/m³.

The LLDPE copolymer, preferably the multimodal znLLDPE copolymer, may have a density of 950 kg/m³ or less, preferably from 905 to 940 kg/m³. For the preferred multimodal znLLDPE copolymer in particular, the density is preferably more than 915 kg/m³. In certain end applications the multimodal znLLDPE copolymer has preferably a density from 915 to 935 kg/m³.

The melt flow rate, $MFR_2$ (ISO 1133, 190° C. at 2.16 load) of the LLDPE copolymer, preferably the multimodal znLLDPE copolymer, is preferably in the range of 0.01 to 20 g/10 min, preferably from 0.05 to 10 g/10 min, preferably from 0.05 to 5.0 g/10 min, more preferably in the range of 0.05 to 2.5 g/10 min, and even more preferably from 0.1 to 0.5 g/10 min.

The polymer component (2) is preferably a multimodal LLDPE copolymer, more preferably a multimodal LLDPE copolymer produced by a Ziegler Natta based catalyst and has preferably at least one, more preferably at least two, and most preferably all of the properties as regards density and $MFR_2$ as defined above.

The term "LLDPE copolymer" as used herein encompasses polymers comprising repeat units deriving from ethylene and at least one other C3-20 alpha olefin monomer. Preferably, LLDPE copolymer, preferably the multimodal znLLDPE copolymer, may be formed from ethylene together with at least one C4-10 alpha-olefin comonomer, e.g. 1-butene, 1-hexene or 1-octene. Preferably, LLDPE copolymer, preferably the multimodal znLLDPE copolymer, is a binary copolymer, i.e. the polymer contains ethylene and one comonomer, or a terpolymer, i.e. the polymer contains ethylene and two or three comonomers. Preferably, LLDPE copolymer, preferably the multimodal znLLDPE copolymer, comprises an ethylene hexene copolymer, ethylene octene copolymer or ethylene butene copolymer. The amount of comonomer present in LLDPE copolymer, preferably the multimodal znLLDPE copolymer, is at least 0.01 mol-%, preferably from 0.02 to 12 wt %, more preferably from 0.3 to 8 wt % relative to ethylene.

The multimodal LLDPE copolymer, may comprise further polymer components, e.g. three components being a trimodal LLDPE copolymer. The amount of such further components is preferably up to 10 wt %, preferably up to 5 wt %, based on the amount of the PE copolymer. Preferably the multimodal LLDPE copolymer consists of LMW and HMW polymer components. Optionally, the multimodal LLDPE copolymer, e.g. the preferable bimodal PE copolymer, may also comprise e.g. up to 5 wt % of a well known polyethylene prepolymer which is obtainable from a prepolymerisation step as well known in the art, e.g. as described in WO9618662. In case of such prepolymer, the prepolymer component is typically comprised in one of LMW and HMW components, or alternatively forms a separate Mw fraction, i.e. further component, of the LLDPE copolymer and thus contributes to the multimodality.

By ethylene homopolymer is meant a polymer which substantially consists of ethylene units. As the process streams may have a small amount of other polymerisable species as impurities the homopolymer may contain a small amount of units other than ethylene.

The LLDPE copolymer, preferably the multimodal znLLDPE copolymer, suitable for the present invention are commercially available or can be produced analogously to or according to well known processes described in the polymer literature. As an Example of commercially available useful multimodal LLDPE polymers are, without limiting to these, i.a. LLDPE grades available from Borealis e.g. under trademark Borstar® FBXXXX, such as Borstar® FB4370, FB2230 etc.

As mentioned above, polymer component (2), preferably the multimodal LLDPE copolymer, can be polymerised using a coordination catalyst, such as Ziegler Natta (ZN) catalyst, SS catalyst, such as a metallocene or non-metalocene catalyst, or a Cr catalyst, or any mixture thereof, more preferably using a ZN or SS catalyst.

When the catalyst is a SS catalyst, then preferably the single site catalyst is a metallocene catalyst. Such catalysts comprise a transition metal compound which typically contains an organic ligand, preferably a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups and like. Suitable metallocene compounds are known in the art and are disclosed, among others, in WO97/28170, WO98/32776, WO99/61489, WO03/010208, WO03/051934, WO03/051514, WO2004/085499, WO2005/002744, EP1752462A and EP1739103A.

In a preferred embodiment, the polymer component (2), preferably the multimodal LLDPE copolymer, is produced using a ZN. Preferably the LMW and HMW components are produced using the same ZN catalyst.

The Ziegler-Natta polymerisation catalyst used for polymerising the polymer component (2), preferably the multimodal LLDPE, is not critical and may be e.g. any ZN catalyst suitable for producing the multimodal znLLDPE copolymer of the invention. Accordingly, Ziegler-Natta catalysts are one of the very well known and commonly used coordination catalysts for producing polymers and typically comprise a transition metal component and an activator. A typical example of ZN catalysts are those produced by activating titanium halides with organometallic compounds such as triethylaluminium.

More specifically, the transition metal component comprises typically a metal of Group 4 or 5 of the Periodic System (IUPAC) as an active metal. In addition, it may contain other metals or elements, like elements of Groups 2, 13 and 17.

Preferably and as mentioned above, the polymerisation catalyst contains a titanium compound, an aluminium compound and a magnesium compound. Such Ziegler-Natta catalysts can be homogenous Ziegler-Natta catalysts or, alternatively, heterogeneous, i.e. solid, Ziegler-Natta catalysts which may be a solidified or precipitated products of the starting materials or be supported on a particulate external support.

The titanium compound is usually a halogen containing titanium compound, preferably chlorine containing titanium compound. Especially preferred titanium compound is titanium tetrachloride.

The aluminium compound is typically aluminium alkyl. Especially preferred compounds are aluminium alkyl dichlorides.

The magnesium compound is typically a reaction product of a magnesium dialkyl, an alcohol and a chlorinating agent. The alcohol is conventionally a linear or branched aliphatic monoalcohol.

The particulate external support can be an inorganic oxide support, such as silica, alumina, titania, silica-alumina and silica-titania, or a magnesium based support, such as magnesium dichloride support.

One preferable catalyst can be prepared by sequentially contacting the carrier with the above mentioned compounds, as described in EP688794A or WO99/51646. Alternatively, it can be prepared by first preparing a solution from the components and then contacting the solution with a carrier, as described in WO01/55230. Other suitable Ziegler Natta catalysts contain a titanium compound together with a magnesium halide compound acting as a support. Thus, the catalyst contains a titanium compound on a magnesium dihalide, like magnesium dichloride. Such catalysts are disclosed, for instance, in WO2005/118655 and EP810235A. As still further preferable embodiment of Ziegler Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO2003/106510 of Borealis.

The Ziegler-Natta catalyst is used together with an activator. Suitable activators are metal alkyl compounds and especially aluminium alkyl compounds. These compounds include alkyl aluminium halides.

In case of a unimodal polymer component (2), e.g. LLDPE polymer, is preferably prepared using a single stage polymerisation, e.g. slurry or gas phase polymerisation, preferably a slurry polymerisation in slurry tank or, more preferably, in loop reactor in a manner well known in the art.

The preferred polymer component (2) is a multimodal (e.g. bimodal) LLDPE copolymer which can be made by mechanical blending two or more, separately prepared polymer components or, preferably, by in-situ blending in a multistage polymerisation process during the preparation process of the polymer components. Both mechanical and in-situ blending is well known in the field.

Accordingly, preferred multimodal LLDPE copolymers, are prepared by in-situ blending in a multistage, i.e. two or more stage, polymerization or by the use of two or more different polymerization catalysts, including multi- or dual site catalysts, in a one stage polymerization.

Preferably the multimodal LLDPE copolymer is produced in at least two-stage polymerization using the same Ziegler-Natta catalyst. Thus, for example two slurry reactors or two gas phase reactors, or any combinations thereof, in any order can be employed. Preferably however, the multimodal LLDPE copolymer is made using a slurry polymerization in a loop reactor followed by a gas phase polymerization in a gas phase reactor.

A loop reactor-gas phase reactor system is marketed by Borealis as a BORSTAR reactor system. The multimodal LLDPE copolymer is thus preferably formed in a two stage process comprising a first slurry loop polymerisation followed by gas phase polymerisation.

The conditions used in such a process are well known. For slurry reactors, the reaction temperature will generally be in the range 60 to 110° C. (e.g. 85-110° C.), the reactor pressure will generally be in the range 5 to 80 bar (e.g. 50-65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerization may if desired be effected under supercritical conditions. Slurry polymerisation may also be carried out in bulk where the reaction medium is formed from the monomer being polymerised.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

Preferably, the lower molecular weight polymer fraction is produced in a continuously operating loop reactor where ethylene is polymerised in the presence of a polymerization catalyst as stated above and a chain transfer agent such as hydrogen. The diluent is typically an inert aliphatic hydrocarbon, preferably isobutane or propane.

The higher molecular weight component can then be formed in a gas phase reactor using the same catalyst.

Where the higher molecular weight component is made second in a multistage polymerisation it is not possible to measure its properties directly. However, the skilled man is able to determine the density, $MFR_2$ etc of the higher molecular weight component using Kim McAuley's equations. Thus, both density and $MFR_2$ can be found using K. K. McAuley and J. F. McGregor: On-line Inference of Polymer Properties in an Industrial Polyethylene Reactor, AIChE Journal, June 1991, Vol. 37, No, 6, pages 825-835.

The density is calculated from McAuley's equation 37, where final density and density after the first reactor is known.

$MFR_2$ is calculated from McAuley's equation 25, where final $MFR_2$ and $MFR_2$ after the first reactor is calculated. The use of these equations to calculate polymer properties in multimodal polymers is common place.

The Polymer composition comprising the multimodal LLDPE copolymer is homogenised and pelletised using a method known in the art. An overview is given, for example, in Rauwendaal: Polymer Extrusion (Hanser, 1986), chapters 10.3 to 10.5, pages 460 to 489.

Carbon Black Component (3)

The optional carbon black (CB) used in the CB component (3) can be any CB suitable for the Polymer composition, for instance any conventional carbon black commercially available and used in the cable layers, preferably in the jacketing layer. Suitable examples are so called furnace blacks which are well known in the field and documented in the literature. As non-exhaustive examples of a supplier of such furnace blacks e.g. Cabot, Evonic or Columbian, can be mentioned.

The CB used in the present invention is preferably introduced to the Polymer composition as a master batch (CBMB). CBMBs comprise a CB in a carrier polymer. CBMBs are commercially available or can be produced e.g. by conventional mixing processes. CB in form of a CBMB is easy to handle and feasible to add to the component(s) of the Polymer composition.

The carrier polymer can be any suitable polymer, e.g. a conventional LDPE polymer produced in a high pressure process or a conventional polymer produced in a low pressure process, such as LLDPE polymer. As examples of suitable carrier polymers, e.g. polymers as described above under polymer component (1) and (2), can be mentioned, however, without limiting to these. The preferred carrier polymer is an LDPE homopolymer or an LDPE copolymer of ethylene with one or more comonomer(s) as defined in relation to polymer component (1).

The used amount of CBMB is as defined above for the CB component (3). The amount of the CB in the master batch can vary in a known manner. Typically, the CBMB contains carbon black of up to 90 wt %, preferably from 1 to 70 wt %, more preferably from 5 to 60 wt %, more preferably from 10 to 50 wt %, even more preferably from 20 to 40 wt %, based on the total amount of CBMB. The amount of the carrier polymer in the CBMB is typically at least 10 wt %, preferably from 30 to 99 wt %, preferably from 40 to 95 wt %, more preferably from 50 to 90 wt %, more preferably from 60 to 80 wt %, based on the total amount of CBMB.

End Uses and End Applications of the Invention

The new Polymer composition of the invention is highly useful in wide variety of end applications of polymers. The preferred use of the Polymer composition is in the wire and cable (W&C) applications.

Accordingly, the invention is further directed to a cable (referred herein as Cable) comprising a conductor surrounded by at a least one polymer layer comprising a polymer composition which comprises a polymer component and optionally a carbon black (CB) component, wherein the polymer composition has a flexural modulus of less than 390 MPa, when determined according to ISO 178 using a pressed test specimen (80×10×4.0 mm, length× width×thickness), and a strain at break (%) of 700% or more, when determined according to ISO 527-1:1993 using a pressed test specimen prepared according ISO527-2:1993 5A.

As stated above, the detailed description of the preferable properties, subgroups and embodiments of the Polymer composition and the components thereof given above applies similarly for the preferable Cables of the invention.

The said at least one layer of the Cable comprising the Polymer composition as defined above or below is preferably at least a jacketing layer.

The Cable is preferably selected from
 a communication cable for communication applications comprising one or more wires surrounded by at least one layer, which is preferably an insulation layer, and the one wire or a bundle of the two or more wires is then surrounded by at least a sheath layer, which is also called as a jacketing layer and which forms the outermost polymeric layer for protecting the one or more wires, or from
 a power cable, which comprises a conductor surrounded by at least one layer, preferably at least an insulation layer and a jacketing layer, in that order,
wherein at least one layer comprises the Polymer composition as defined above or in claims below. The communication and power cable have a well known meaning in the W&C field.

A communication cable is a cable for transferring information signals like telecommunication cables or coaxial cables. A telecommunication cable comprises a plurality of telesingle wires each surrounded by an insulation composition, typically an insulation layer. The number of telesingle wires may vary from a few in a data transmission cable to up to several thousands in telephone cables. All these wires are then surrounded by a common protective sheath layer, also called as jacketing layer, which surrounds and protects the wire bundle. Preferably the sheath layer comprises, preferably consists of the polymer composition of the invention.

A coaxial cable has typically one centre conductor and at least one outer concentric conductor. If more than one outer conductor is used, e.g. triaxial cables, they are separated by an electrically isolating layer. Also the coaxial cables are surrounded by at least a sheath, also called jacketing, layer. The sheath layer preferably comprises, more preferably consists of, the polymer composition of the invention.

A power cable is a cable transferring energy operating at any voltage, typically operating at voltages higher than 220 V. The voltage applied to the power cable can be alternating (AC), direct (DC), or transient (impulse). The Polymer composition is also very suitable for layers of power cables such as low voltage (LV) (e.g. 1 kV cables), medium voltage (MV), high voltage (HV) and extra high voltage (EHV) power cables, which terms have well known meaning and indicate the operating level of such cable.

The preferable MV, HV and EHV Cable embodiment of the invention comprises at least an inner semiconductive layer, insulation layer, an outer semiconductive layer and optionally, and preferably, a jacketing layer, in that order, wherein at least one of said layers, preferably at least the jacketing layer, comprises, preferably consists of, said Polymer composition of the invention.

The preferable power cable embodiment is a LV power cable, such as 1 kV Cable, which comprises at least an insulation layer and optionally a bedding layer and optionally and preferably, a jacketing layer, in that order, wherein at least one of said layers, preferably at least the jacketing layer, comprises, preferably consist of, said Polymer composition of the invention.

Cables according to the present invention can be produced according to the methods known in the art using the polymer composition as described above.

The components of the Polymer composition can be provided to the Cable preparation process in form of a grain, powder or pellets. Pellets can be of any shape or size.

Accordingly, the invention also provides a process for producing a Cable, which process comprises steps of a) applying on a conductor one or more layers by using the Polymer composition as defined above and below.

The process for producing a Cable, such as a communication or power cable, as defined above and below, comprises melt mixing, i.e. blending the components of Polymer composition as defined above, including the subgroups and embodiments thereof, optionally with other polymer components and optionally with additives, above the melting point of at least the major polymer component(s) of the obtained mixture, and (co)extruding the obtained melt mixture on a conductor for forming one or more polymer layer(s), wherein at least one contains the Polymer composition. Melt mixing is preferably carried out in a temperature of 20-25° C. above the melting or softening point of polymer component(s).

Preferably, said Polymer composition is a blend of Polymer components (1) and (2) and the optional, and preferable, carbon black (CB) component (3). The polymer components (1) are (2) and preferable CB component (3) are mixed together in a conventional mixer and/or cable producing extruder. The Polymer components (1) and (2) are each preferably added in form of pellets to the mixing step and then melt mixed. Preferably the CB component (3), preferably the master batch (CBMB) (3), is then added to the blend of polymer components (1) and (2). The used and preferable amounts are defined above and in claims. Further component, e.g. further additives, may be added before or during the Cable manufacturing process. The processing temperatures and devices are well known in the art, e.g. conventional mixers and extruders, such as single or twins screw extruders, are suitable for the process of the invention.

The Cable can be crosslinkable, wherein at least one of the layers can be crosslinked to provide a crosslinked Cable. Invention provides also a Cable which is crosslinkable and a crosslinked Cable.

Accordingly, the Cable manufacture process comprises optionally a further subsequent step of b) crosslinking a crosslinkable polymer, e.g. a crosslinkable Polymer composition, in at least one cable layer of the obtained Cable, wherein the crosslinking is effected in the presence of a crosslinking agent, which is preferably a peroxide. Typically the crosslinking temperature is at least 20° C. higher than the temperature used in meltmixing step and can be estimated by a skilled person.

Usable manufacturing and crosslinking processes and devices are known and well documented in the literature.

The layer of the Cable comprising the Polymer composition, preferably consists of the Polymer composition.

Determination Methods

Unless otherwise stated the following methods were used for determining the properties of the Polymer composition or the components thereof as given in the description or in the experimental part and claims below. Unless otherwise stated, the samples used in the tests consist of the polymer composition or, respectively as specified, of the polymer component to be tested.

Melt Index

The melt flow rate (MFR) is determined according to ISO 1133 and is indicated in g/10 min. The MFR is an indication of the melt viscosity of the polymer. The MFR is determined at 190° C. for PE and at 230° C. for PP. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Mz, Mw, Mn, and MWD are Measured by Gel Permeation Chromatography (GPC) According to the Following Method:

The weight average molecular weight Mw and the molecular weight distribution (MWD=Mw/Mn wherein Mn is the number average molecular weight and Mw is the weight average molecular weight; Mz is the z-average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

Flexural Modulus

Flexural modulus was determined according to ISO 178: 1993. The test specimens were prepared from pellets of the test polymer composition pressed to a dimensions of 80×10× 4.0 mm (length×width×thickness). The length of the span between the supports was 64 mm, the test speed was 2 mm/min and the load cell was 100 N. The equipment used was an Alwetron TCT 25.

Tensile Properties

Stress at Break and Strain at Break

Stress at break and Strain at break are measured according to ISO 527-1:1993 using a sample prepared according to ISO527-2: 1993 5A (pressed test specimen prepared from pellets of the test polymer composition).
Stress at break tensile tester: Alwetron TCT10, Lorentzen&WettreAB
Draw speed: 50 mm/min
Effective sample length: 50 mm Short Chain Branching (SCB) Determination Method Determination of short chain branching as a function of molecular weight (SCB(MW) profile):

Molecular weight distribution (MWD) and its the short chain branching as a function of the molecular weight were determined by Gel Permeation Chromatography (GPC). A Waters GPC2000 instrument, equipped with heated flow cell (at 140° C.) connected via a heated transfer line (at 140° C.) was used with 2× Olexis and 1× Olexis Guard columns from Polymer Laboratories and 1,2,4-trichlorobenzene (TCB) as solvent at 140° C. and at a constant flow rate of 1 mL/min. The heated flow cell is mounted on a sample plate located in a Perkin Elmer Spectrum 100 equipped with a MCT detector. The MCT detector is cooled with liquid nitrogen. During the chromatographic run a series of FTIR spectra is collected using the Perkin Elmer TimeBase V3.0 software. The spectrometer settings were 16 accumulations, scan range from 3000 $cm^{-1}$ to 2700 $cm^{-1}$, resolution 8 $cm^{-1}$. A background spectrum taken under GPC run conditions is substracted from each spectrum collected during the chromatographic run. 423.5 µL of sample solution were injected per analysis. The column set was calibrated using universal calibration (according to ISO 16014-2:2003) with at least 10 narrow MWD polystyrene (PS) standards in the range of 0.6 kg/mol to 6 000 kg/mol. Mark Houwink constants for PS and PE used are as per ASTM D 6474-99. All samples were prepared by dissolving 7.0-9.0 mg of polymer in 4 mL (at 140° C.) of stabilized TCB (stabilized with 250 mg/L 2,6-Di tert butyl-4-methyl-phenol) and keeping for max. 3 hours at max. 160° C. with continuous gentle shaking prior sampling in into the GPC instrument. The spectral data as recorded by Perkin Elmer TimeBase 3.0 software is imported into Polymer Laboratories Cirrus V3.1 software and the evaluation towards molecular weights and molecular weight distribution was performed with this software. The spectral data was converted into chromatograms using root-mean-square (RMS) absorbance over the 3000-2700 $cm^{-1}$ spectral region. The molecular weight distributions were calculated from the generated chromatogram and universal calibration. A correction for possible long chain branching influence on hydrodynamic volume, intrinsic viscosities and thereby the calculated molecular weights was not performed.

The evaluation towards short chain branching was performed as described in P. J. DesLauriers, D. C. Rohlfing, E. T. Hsieh; Polymer 2002, 43, 159-170. This chemometric method is a correlation of the absorbance spectra obtained by FTIR per retention time or per slice molecular weight respectively with methyl branching per 1000 total carbons as obtained by carbon-13 nuclear magnetic resonance spectroscopy (NMR).

The short chain branching training set covered a broad range of differently branched polyethylenes in order to generate most universal SCB calibration. This set included over 100 samples, both single site catalysed and fractions of Ziegler Natta catalysed medium to high molecular weight polyethylene-co-butene, polyethylene-co-hexene, and polyethylene-co-octene as well as n-alkanes covering an overall branching level from 0 to 67 methyl groups per 1000 total carbons (CH3/1000TC) Calibration samples having during chemometric model generation a probabilities>0.95 were considered as outliers. The branching degree of all calibration set samples was determined by 13 C melt-state NMR or calculated for the n-alkanes. A four component calibration model was generated from partial least square regression (PLS1) using Infometrix Pirouette 3.11 software. Evaluation of short chain branching was performed via multivariate analysis by applying the chemometric calibration model. Outlier detection for individual measurements was generated from probability values. Both was obtained through chemometric software (Infometrix Instep 1.2) in combination with Polymer Laboratories FTIR add on software for Cirrus software. The short chain branching was determined as methyl branching per 1000 total carbons (CH3/1000TC). No correction for possible methyl chain end groups was performed. SCB data having probabilities>0.96 were considered outliers.
Calculation of Main Data Section (Centered 90 wt % of Total MWD Region)

The normalised cumulative curves (total area under the curve is 1) of the molecular weight distribution were calculated from the MWD (dw/dlogM as a function of logM). SCB data was used only obtained in the region of 0.05×0.95 (weight fraction) or 5 wt. %<x<95 wt. % (weight percentage) respectively. The arithmetic mean was calculated from SCB data (determined as CH3/1000TC) in the molecular weight region of centered 90 wt. %.

ESCR (Environmental Stress Cracking)

The determination was carried out according to procedure described in IEC 60811-4-1:2004, Chapter 8, "Resistance to environmental stress cracking", Procedure B, 10% solution (by volume) in water of Igepal CO-630. The International Electrotechnical Commission (IEC) is a worldwide organization for standardization comprising all national electrotechnical committees (IEC National Committees). The pressed test specimens were prepared from pellets of the test polymer composition.

Rheology, Dynamic (Viscosity, Shear Thinning Index):

Rheological parameters such as Shear Thinning Index SHI and Viscosity are determined by using a rheometer, preferably a Anton Paar Physica MCR 300 Rheometer on compression moulded samples under nitrogen atmosphere at 190° C. using 25 mm diameter plates and plate and plate geometry with a 1.8 mm gap. The oscillatory shear experiments were done within the linear viscosity range of strain at frequencies from 0.05 to 300 rad/s (ISO 6721-1). Five measurement points per decade were made.

The values of storage modulus (G'), loss modulus (G") complex modulus (G*) and complex viscosity ($\eta^*$) were obtained as a function of frequency ($\omega$). $\eta_{100}$ is used as abbreviation for the complex viscosity at the frequency of 100 rad/s.

Shear thinning index (SHI), which correlates with MWD and is independent of Mw, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.).

SHI value is obtained by calculating the complex viscosities at given values of complex modulus and calculating the ratio of the two viscosities. For example, using the values of complex modulus of 2.7 kPa and 210 kPa, then $\eta^*(2.7$ kPa) and $\eta^*(210$ kPa) are obtained at a constant value of complex modulus of 2.71 kPa and 210 kPa, respectively. The shear thinning index $SHI_{2.7/210}$ is then defined as the ratio of the two viscosities $\eta^*(2.7$ kPa) and $\eta^*(210$ kPa), i.e. $\eta(2.7)/\eta(210)$.

It is not always practical to measure the complex viscosity at a low value of the frequency directly. The value can be extrapolated by conducting the measurements down to the frequency of 0.126 rad/s, drawing the plot of complex viscosity vs. frequency in a logarithmic scale, drawing a best-fitting line through the five points corresponding to the lowest values of frequency and reading the viscosity value from this line.

EXPERIMENTAL PART

Polymer Components of the Inventive Examples:

Polymer Component (1):
LDPE (1), which is a conventional low density polyethylene homopolymer, produced in a high pressure process, in a tubular reactor, and has the properties as given in table 1.

Polymer Component (2):
Multimodal (bimodal) znLLDPE (2)

Catalyst Preparation:
Complex Preparation:
87 kg of toluene was added into the reactor. Then 45.5 kg Bomag A in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:
275 kg silica (ES747JR of Crossfield, having average particle size of 20 μm) activated at 600° C. in nitrogen was charged into a catalyst preparation reactor. Then, 411 kg 20% EADC (2.0 mmol/g silica) diluted in 555 liters pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22° C. during ten minutes. The slurry was stirred for 8 hours at 50° C. Finally, 52 kg $TiCl_4$ was added during 0.5 hours at 45° C. The slurry was stirred at 40° C. for five hours. The catalyst was then dried by purging with nitrogen.

Polymerisation:
Multimodal znLLDPE polymer was prepared in a pilot scale multistage reactor system containing a loop reactor and a gas phase reactor. A prepolymerisation step preceded the actual polymerisation step. The prepolymerisation stage was carried out in slurry in a 50 dm³ loop reactor at about 80° C. in a pressure of about 65 bar using the polymerisation catalyst prepared as described above and triethylaluminium as the cocatalyst. The molar ratio of aluminium of the cocatalyst to titanium of the catalyst was about 20. Ethylene was fed in a ratio of (200 g of C2)/(1 g/catalyst). Propane was used as the diluent and hydrogen was fed in amount to adjust the $MFR_2$ of the prepolymer to about 10 g/10 min. The obtained slurry together with prepolymerised catalyst and triethyl aluminium cocatalyst were transferred to the actual polymerisation step, i.e. introduced into a 500 dm³ loop reactor, wherein a continuous feed of propane, ethylene and hydrogen was also introduced. The ratio of H2/C2 in the reaction mixture was 240 mol/kmol. Also comonomer, 1-butene, was added to the loop reactor in amounts as given in table 1 below. The loop reactor was operated at 95° C. temperature and 60 bar pressure. The process conditions were adjusted as shown in Table 1 to form polymer having an MFR$_2$ of 300 g/10 min and a density of about 951 kg/m$^3$ at a production rate of about 30 kg/h.

The slurry was then transferred to a fluidised bed gas phase reactor, where also additional ethylene, 1-butene comonomer and hydrogen were added, together with nitrogen as an inert gas to produce the HMW component in the presence of the LMW component. The ratio of H2/C2 in the recycle gas was 7 mol/kmol and the ratio of C4/C2 was 460 mol/kmol. The gas phase reactor was operated at a temperature of 80° C. and a pressure of 20 bar. The production rate of the polymer was about 75 kg/h. The split (wt %) loop/gas phase was 41/59. The polymer obtained from the gas phase reactor had MFR$_2$ of 0.2 g/10 min and a density of about 923 kg/m$^3$.

The reactor powder was then stabilised with conventional additives and pelletized in a known manner using CIM90P counter-rotating twin screw extruder manufactured by Japan Steel Works. The polymerisation conditions, polymer and product properties of the pelletized final polymers are given in table 1 below.

TABLE 1

Polymerisation conditions and the product properties of the obtained polymer of example 1

| Polymer | Ex. 1 znLLDPE |
|---|---|
| Ethylene concentration in loop reactor, mol-% | 6.7 |
| Hydrogen to ethylene ratio in loop reactor, mol/kmol | 240 |
| 1-butene to ethylene mole ratio in loop reactor, mol/kmol | 570 |
| Polymer production rate in loop reactor, kg/h | 30 |
| MFR$_2$ of polymer produced in loop reactor, g/10 min | 300 |
| Density of polymer produced in loop reactor, kg/m$^3$ | 951 |
| Ethylene concentration in gas phase reactor, mol-% | 19 |
| Hydrogen to ethylene ratio in gas phase reactor, mol/kmol | 7 |
| 1-butene to ethylene mole ratio in gas phase reactor, mol/kmol | 460 |
| Polymer production rate in gpr, kg/h | 75 |
| Split, loop/gpr | 41/59 |
| MFR$_2$ of the pelletized final polymer, g/10 min | 0.2 |
| Density of the pelletized final polymer, kg/m$^3$ | 923 |

CB Component (3):

A masterbatch of carbon black and a carrier polymer. Contains 35 wt % of CB which is a furnace black, supplied by Evonic, and 75 wt % of the carrier polymer which is a conventional LDPE homopolymer, produced in a high pressure process. The properties are listed in table 1.

REFERENCE EXAMPLES

Reference 1

A commercially available reference grade of a low density polyethylene used in cable jacketing layers and comprising 88 wt % a conventional LDPE reference homopolymer produced in a high pressure process, 5.5 wt % a conventional copolymer of ethylene with vinyl acetate comonomer (VA content 28%) produced in a high pressure process and 6.5 wt % of the CBMB component (3). Thus the CBMB component is the same as CBMB (3) given above for inventive compositions. The properties are listed in table 1.

Reference Example 2

A commercially available reference grade based on a conventional bimodal linear low density polyethylene (LLDPE) copolymer produced in the presence of a conventional Ziegler-Natta catalyst in a low pressure process and used in cable jacketing layers. Reference 2 comprises 93.0 wt % of the znLLDPE reference copolymer and 7.0 wt % of the CBMB component (3). Thus the CBMB component is the same as CBMB (3) given above for inventive compositions. The properties are listed in table 1.

TABLE 1

Properties of the polymer components and inventive and reference polymer compositions and experimental data

| Parameter | Polymer component 1 LDPE (1) | Polymer component 2 znLLDPE (2) (bimodal) | CB component 3 CBMB (3) | Inv. Polymer composition 1 | Inv. Polymer composition 2 | Inv. Polymer composition 3 | Inv. Polymer composition 4 | Reference 1 LDPE ref | Reference 2 Bimodal znLLDPE ref |
|---|---|---|---|---|---|---|---|---|---|
| Wt % of the components in the Polymer composition | 100 | 100 | 100 | LDPE (1)/ znLLDPE (2)/ CBMB (3) of 55.4/37.5/7.1 | LDPE (1)/ znLLDPE (2)/ CBMB (3) of 55.3/37.5/7.2 | LDPE (1)/ znLLDPE (2)/ CBMB (3) of 40.0/53.0/7.0 | LDPE (1)/ znLLDPE (2)/ CBMB (3) of 60.0/33.0/7.0 | LDPE ref/EVA/ CBMB (3) of 88.0/5.5/6.5 | znLLDPE ref/CBMB (3) of 93.0/7.0 |
| MFR2 | 1 | 0.2 | | 0.32 | 0.35 | 0.35 | 0.59 | 0.2 | 0.85 |
| ESCR (h) | 4 | | | >2500 cont. | >2500 cont. | >3200 | 1300 | >1800 | >5000 |
| Stress at break (MPa) | 15 | 28 | | 25.8 | 25 | 28 | 23 | >15 | 25 |
| Strain at break (%) | 600 | 600 | | 830 | 800 | 790 | 870 | 600 | 750 |
| Density | | 923 | | 927.4 | 933 | 932.5 | 933.4 | 931 | 936 |

TABLE 1-continued

Properties of the polymer components and inventive and reference polymer compositions and experimental data

| Parameter | Polymer component 1 LDPE (1) | Polymer component 2 znLLDPE (2) (bimodal) | CB component 3 CBMB (3) | Inv. Polymer composition 1 | Inv. Polymer composition 2 | Inv. Polymer composition 3 | Inv. Polymer composition 4 | Reference 1 LDPE ref | Reference 2 Bimodal znLLDPE ref |
|---|---|---|---|---|---|---|---|---|---|
| Flexural modulus (MPa) | 240 | 370 | | 290 | 300 | 380 | 325 | 250 | 400 |
| SHI (2.7/210) | 94 | 36 | | 84 | 90 | 63 | 69 | 300 | 26 |
| SCB arithmetic mean in centered 90 wt. % MWD region [CH3/1000TC] | 17 | 15 | 21 | 19 | 17 | 17 | 16 | 18 | 17 |
| minimum SCB in centered 90 wt. % region [CH3/1000TC] | 14 | 11 | 17 | 17 | 15 | 14 | 15 | 14 | 12 |
| maximum SCB in centered 90 wt. % region [CH3/1000TC] | 21 | 21 | 31 | 22 | 19 | 20 | 19 | 24 | 21 |

The invention claimed is:

1. A cable comprising a conductor surrounded by at least one jacketing layer comprising a polymer composition which comprises a polymer component and a carbon black (CB) component, wherein the polymer composition has a flexural modulus of less than 390 MPa, when determined according to ISO 178 using a pressed test specimen (80×10×4.0 mm, length×width×thickness), and a strain at break (%) of 700% or more, when determined according to ISO 527-1:1993 using a pressed test specimen prepared according ISO527-2:1993 5A; and wherein the polymer composition contains:
(1) at least 40 wt %, of an LDPE polymer selected from an LDPE homopolymer or an LDPE copolymer of ethylene with one or more comonomers;
(2) less than 60 wt %, of LLDPE polymer which is a linear low density copolymer of ethylene with one or more olefin comonomers, and
(3) from 1 to 20 wt %, of a carbon black masterbatch, based on the total amount of the polymer composition.

2. The cable according to claim 1, which is selected from:
a communication cable for communication applications comprising one or more wires surrounded by at least one layer, which is preferably an insulation layer, and then surrounded by the jacketing layer, in that order;
a power cable, which comprises a conductor surrounded by at least an insulation layer and the jacketing layer, in that order; or
a power cable, which comprises a conductor surrounded by at least an inner semiconductive layer, an insulation layer, an optional and preferable outer semiconductive layer, and the jacketing layer.

3. The cable according to claim 1 wherein the polymer component of the polymer composition has a short chain branching (SCB) profile expressed as a function of molecular weight (abbreviated as SCB(MW) profile) of X±5 CH$_3$/1000 total carbon atoms (abbreviated as 1000TC) or less, wherein X is the arithmetic mean in centered 90 weight-% of total region of the molecular weight distribution (MWD), when determined according to the SCB determination method as described under "Determination methods".

4. The cable according to claim 1 wherein the polymer component of the polymer composition has the arithmetic mean X of SCB(MW) profile of 17 in centered 90 weight-% of total region of the molecular weight distribution (MWD) and the polymer component of the polymer composition has a SCB(MW) profile of 17±5 CH$_3$/1000TC or less, in centered 90 weight-% of total region of the molecular weight distribution (MWD), when determined according to the SCB determination method as described under "Determination methods".

5. The cable according to claim 1 wherein the polymer composition has an environmental stress cracking resistance (ESCR) of at least 1500 hours, when determined according to IEC 60811-4-1:2004 (procedure in Chapter 8, "Resistance to environmental stress cracking", Procedure B, 10% by volume solution in water of Igepal CO-630).

6. The cable according to claim 1 wherein the MFR$_2$ of the polymer composition is of less than 2.0 g/10 min when measured according to ISO 1133 (190° C. at 2.16 load).

7. The cable according to claim 1 wherein the polymer composition has a shear thinning index SHI$_{2.7/210}$ of at least 45, when measured as described under "Determination methods".

8. The cable according to claim 1 wherein the polymer composition has at least one of the following properties:
(a) a flexural modulus of less than 350 MPa,
(b) a stress at break of at least 20 MPa, when determined according to ISO 527-1:1993 using a pressed test specimen prepared according to ISO527-2: 1993 5A,
(c) a strain at break (%) of 750% or more, when determined according to ISO 527-1:1993 using a pressed test specimen prepared according to ISO527-2: 1993 5A, and
(d) a density of more than 890 kg/m$^3$.

9. The cable according to claim 1 wherein the polymer composition comprises at least 50 wt %, of the polymer component and the from 0 to 20 wt %, of carbon black as such, based on the total amount of the polymer composition.

10. The cable according to claim 1 wherein the polymer composition is selected from the group consisting of (i) a polyethylene composition, wherein the polymer comprises at least one polyethylene component, (ii) a blend of at least two polyethylene components (1) and (2) which are different, and
(iii) a polymer composition which comprises:
- (1) at least 30 wt % of a polyethylene component which is an ethylene homopolymer or copolymer of ethylene which contains one or more comonomer(s),
- (2) less than 70 wt % of a polyethylene component which is an ethylene olefin homopolymer or copolymer of ethylene which contains one or more comonomer(s), and
- (3) up to 20 wt %, of optional carbon black based on the total amount of the Polymer composition.

11. The cable according to claim 1 wherein (2) the LLDPE polymer is a multimodal ethylene copolymer (multimodal LLDPE copolymer) which comprises:
- (A) from 30 to 70% by weight (wt %), based on the combined amount of components (A) and (B), of a low molecular weight (LMW) ethylene polymer selected from an ethylene homopolymer or a copolymer of ethylene with one or more alpha-olefin comonomer(s) having from 3 to 20 carbon atoms, and
- (B) from 30 to 70% by weight, based on the combined amount of components (A) and (B), of a high molecular weight (HMW) copolymer of ethylene with one or more alpha-olefin comonomer(s) having from 3 to 20 carbon atoms, wherein the LMW ethylene polymer and the HMW copolymer are different.

12. The cable according to claim 1 wherein the polymer component (1) is a LDPE polymer which has an $MFR_2$ (ISO 1133, 190° C. at 2.16 load) of less than 10 g/10 min, and
the polymer component (2) is a multimodal LLDPE copolymer, and has at least one of the following properties:
- (a) a density of 950 kg/m³ or less, or
- (b) an $MFR_2$ (ISO 1133, 190° C. at 2.16 load) from 0.01 to 20 g/10 min.

13. A process for producing a cable according to claim 1 comprising applying at least one jacketing layer comprising a polymer composition which comprises a polymer component and optionally a carbon black (CB) component, wherein the polymer composition has a flexural modulus of less than 390 MPa, when determined according to ISO 178 using a pressed test specimen (80×10×4.0 mm, length×width×thickness), and a strain at break (%) of 700% or more, when determined according to ISO 527-1:1993 using a pressed test specimen prepared according to ISO527-2:1993 5A on a conductor.

14. The cable according to claim 1 wherein the polymer composition contains at least 30 wt % of the LLDPE polymer (2).

15. A polymer composition which is adapted for use as a cable jacketing layer, which comprises a polymer component and a carbon black (CB) component,
wherein the polymer composition has a flexural modulus of less than 390 MPa, when determined according to ISO 178 using a pressed test specimen (80×10×4.0 mm, length×width×thickness), and strain at break (%) of 700% or more, when determined according to ISO 527-1:1993 using a pressed test specimen prepared according to ISO527-2:1993 5A; and
wherein the polymer composition contains,
- (1) at least 40 wt %, of an LDPE polymer selected from an LDPE homopolymer or an LDPE copolymer of ethylene with one or more comonomer(s);
- (2) less than 60 wt %, of LLDPE polymer which is a linear low density copolymer of ethylene with one or more olefin comonomers, and
- (3) from 1 to 20 wt %, of a carbon black masterbatch, based on the total amount of the polymer composition.

16. The polymer composition according to claim 15, wherein the polymer component of the polymer composition has a short chain branching (SCB) profile and wherein
the polymer component of the polymer composition has a short chain branching (SCB) profile expressed as a function of molecular weight (abbreviated as SCB(MW) profile) of X±5 $CH_3$/1000 total carbon atoms (abbreviated as 1000TC), or less, wherein X is the arithmetic mean in centered 90 weight-% of total region of the molecular weight distribution (MWD), when determined according to the SCB determination method as described under "Determination methods", and/or
the polymer component of the polymer composition has the arithmetic mean X of SCB(MW) profile of 17 in centered 90 weight-% of total region of the molecular weight distribution (MWD) and the polymer component of the polymer composition has a SCB(MW) profile of 17±5 $CH_3$/1000TC or less, in centered 90 weight-% of total region of the molecular weight distribution (MWD), when determined according to the SCB determination method as described under "Determination methods".

17. The polymer composition according to claim 15 wherein the polymer composition has an environmental stress cracking resistance (ESCR) of at least 1500 hours, when determined according to IEC 60811-4-1:2004 (procedure in Chapter 8, "Resistance to environmental stress cracking", Procedure B, 10% by volume solution in water of Igepal CO-630).

18. The polymer composition according to claim 15 wherein the $MFR_2$ of the polymer composition is of less than 2.0 g/10 min, when measured according to ISO 1133 (190° C. at 2.16 load).

19. The polymer composition according to claim 15 wherein the polymer composition has a shear thinning index $SHI_{2.7/210}$ of at least 45, when measured as described under "Determination methods".

20. The polymer composition according to claim 15 wherein the polymer composition has at least one of the following properties:
- (a) a flexural modulus of less than 350 MPa,
- (b) a stress at break of at least 20 MPa, when determined according to ISO 527-1:1993 using a pressed test specimen prepared according to ISO527-2: 1993 5A,
- (c) a strain at break (%) of 750% or more, when determined according to ISO 527-1:1993 using a pressed test specimen prepared according to ISO527-2: 1993 5A, and
- (d) a density of more than 890 kg/m³.

* * * * *